US006047464A

United States Patent [19]

Chadbourne et al.

[11] Patent Number: 6,047,464

[45] **Date of Patent: *Apr. 11, 2000**

[54] REMOVAL TOOL

[75] Inventors: Richard Chadbourne, Merrimack; Raymond G. Lavoie, Manchester, both of N.H.

[73] Assignee: Framatome Connectors USA, Inc., Fairfield, Conn.

[ * ] Notice: This patent issued on a continued prosecution application filed under 37 CFR 1.53(d), and is subject to the twenty year patent term provisions of 35 U.S.C. 154(a)(2).

[21] Appl. No.: 09/099,168

[22] Filed: Jun. 18, 1998

[51] Int. Cl.[7] .......... B23P 19/00

[52] U.S. Cl. .......... 29/764; 29/33 M; 29/762; 29/768

[58] Field of Search .......... 29/33 M, 762, 29/764, 768

[56] References Cited

U.S. PATENT DOCUMENTS

| | | | |
|---|---|---|---|
| 4,461,073 | 7/1984 | Harringer et al. | 29/741 |
| 4,602,494 | 7/1986 | Carrillo | 72/384 |
| 4,604,796 | 8/1986 | Tsipenyuk et al. | 29/764 |
| 4,821,383 | 4/1989 | Grosklos et al. | 29/33 M |
| 4,894,910 | 1/1990 | Reimer et al. | 29/764 |
| 4,970,460 | 11/1990 | Jensen et al. | 324/158 F |
| 5,507,671 | 4/1996 | Chadbourne et al. | 439/783 |
| 5,538,447 | 7/1996 | Chadbourne et al. | 439/783 |
| 5,558,546 | 9/1996 | Chadbourne et al. | 439/783 |
| 5,613,883 | 3/1997 | Chadbourne et al. | 439/783 |
| 5,679,031 | 10/1997 | Chadbourne et al. | 439/783 |

OTHER PUBLICATIONS

AMP—U.D.C.—Universal Distribution Connector—Reinforced—Catalog 124470, Revised Dec. 1995, "Extraction Tool for Symmetrical Connectors" —PN 572882-1—IS 411-37009, one sheet.

*Primary Examiner*—Lee Young
*Assistant Examiner*—Binh-An Nguyen
*Attorney, Agent, or Firm*—Perman & Green, LLP

[57] ABSTRACT

A removal tool is operable for separating components of an assembled electrical connector used for connecting electrical conductors together. The electrical connector includes a tapered connector sleeve having a general "C" cross section with a slot defining a stop ledge and a wedge having a latching ledge which engages the stop ledge when inserted into the slot preventing removal of the wedge. The removal tool with a first block member includes outwardly projecting ears for selective insertion into the slot for engagement with the stop ledge. A second block member includes outwardly projecting slide pins. The first block member is slidably received on the slide pins for movement toward and away from the second block member, a removal blade on the second block member having a tapered nose member projecting toward the first block member and an integral shoulder on the second block member facing the first block member and spaced from the removal blade in a direction away from the first block member. When the assembled electrical connector is positioned on the removal tool with the ears projecting into the slot of the connector sleeve and the tapered nose member is inserted between the wedge and the connector sleeve, movement of the first block member toward the second block member causes the latching ledge of the wedge to disengage from the stop ledge. With continued movement of the first block member toward the second block member the shoulder engages the wedge and forces its removal from the connector sleeve.

8 Claims, 8 Drawing Sheets

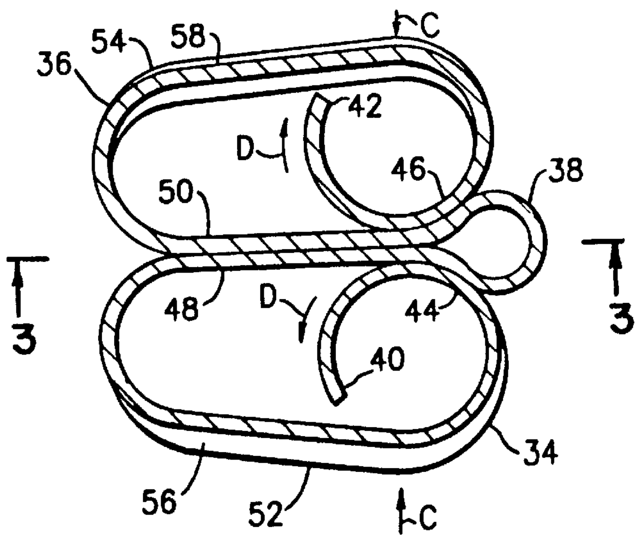
FIG. 2
PRIOR ART
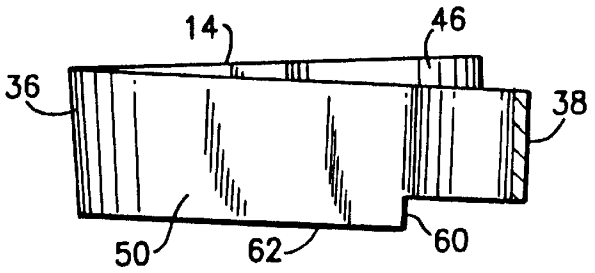
FIG. 3
PRIOR ART
FIG. 4
PRIOR ART
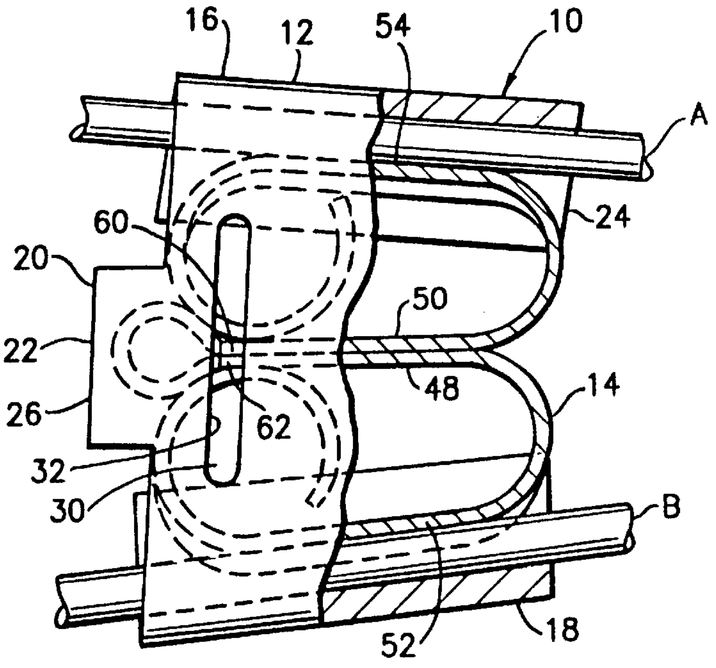

REMOVAL TOOL

BACKGROUND OF THE INVENTION

1. Field of the Invention

The present invention relates to electrical wedge connectors and, more particularly, to a tool for separating components of an electrical wedge connector.

2. Description of the Prior Art

U.S. Pat. No. 4,650,273 discloses an electrical connector with a general "C" shaped sleeve and a wedge. The wedge is stamped and formed from sheet metal and has a tab at its front end. The tab engages a front end of the sleeve to withdraw the wedge from the sleeve. U.S. Pat. No. 5,006,081 discloses a wedge connector with a "C" shaped sleeve having a hole in its middle section for engaging a dimple on a stamped and formed sheet metal wedge. Other U.S. patents that relate to wedge connectors include the following:

| | | | |
|---|---|---|---|
| 2,106,724 | 3,462,543 | 4,600,264 | 4,863,403 |
| 2,814,025 | 3,504,332 | 4,634,205 | 4,872,856 |
| 2,828,147 | 3,516,050 | 4,723,920 | 4,915,653 |
| 3,065,449 | 3,588,791 | 4,723,921 | 5,044,996 |
| 3,275,974 | 3,920,310 | 4,730,087 | 5,145,420 |
| 3,329,928 | 4,059,333 | 4,734,062 | 5,244,422 |
| 3,349,167 | 4,533,205 | 4,813,894 | |

It was with knowledge of the foregoing that the present invention was conceived and has now been reduced to practice.

SUMMARY OF THE INVENTION

According to the invention, a removal tool is operable for separating components of an assembled electrical connector used for connecting electrical conductors together. The electrical connector includes a tapered connector sleeve having a general "C" cross section with an slot defining a stop ledge and a wedge having a latching ledge which engages the stop ledge when inserted into the slot preventing removal of the wedge. A first block member includes outwardly projecting ears for selective insertion into the slot for engagement with the stop ledge. A second block member includes outwardly projecting slide pins. The first block member is slidably received on the slide pins for movement toward and away from the second block member, a removal blade on the second block member having a tapered nose member projecting toward the first block member and an integral shoulder on the second block member facing the first block member and spaced from the removal blade in a direction away from the first block member. When the assembled electrical connector is positioned on the removal tool with the ears projecting into the slot of the connector sleeve and the tapered nose member is inserted between the wedge and the connector sleeve, movement of the first block member toward the second block member causes the latching ledge of the wedge to disengage from the stop ledge. With continued movement of the first block member toward the second block member the shoulder engages the wedge and forces its removal from the connector sleeve.

A primary feature, then, of the present invention is the provision of a tool for separating components of an electrical wedge connector.

According to another feature of the invention, one block member has ears that fit through a slotted hole in the C-frame member of the connector. These ears are visually located on both sides of the deflecting beam of the wedge member of the connector. The blade or nose member on the other block member inserts between the wedge and the C-frame member lifting and unlatching the deflecting beam. The block on top of the blade pushes the wedge out of the C-frame. Adjustable pliers are desirably used to apply the force needed for the removal effort.

Other and further features, advantages, and benefits of the invention will become apparent in the following description taken in conjunction with the following drawings. Although the present invention will be described with reference to the embodiments shown in the drawings, it should be understood that the present invention can be embodied in many alternate embodiments. In addition, any suitable size, shape or type of elements or materials could be used. The accompanying drawings which are incorporated in and constitute a part of this invention, illustrate one of the embodiments of the invention, and together with the description, serve to explain the principles of the invention in general terms. Like numerals refer to like parts throughout the disclosure.

BRIEF DESCRIPTION OF THE DRAWINGS

In the accompanying drawings,

FIG. 2 is a cross-sectional view of the wedge shown in FIG. 1 taken along line 2—2;

FIG. 3 is a cross-sectional view of the wedge shown in FIG. 2 taken along the line 3—3;

FIG. 4 is a side view with partial cutaway section of the connector shown in FIG. 1 connected to the two electrical conductors;

DETAILED DESCRIPTION OF THE PREFERRED EMBODIMENTS

Figure 1:
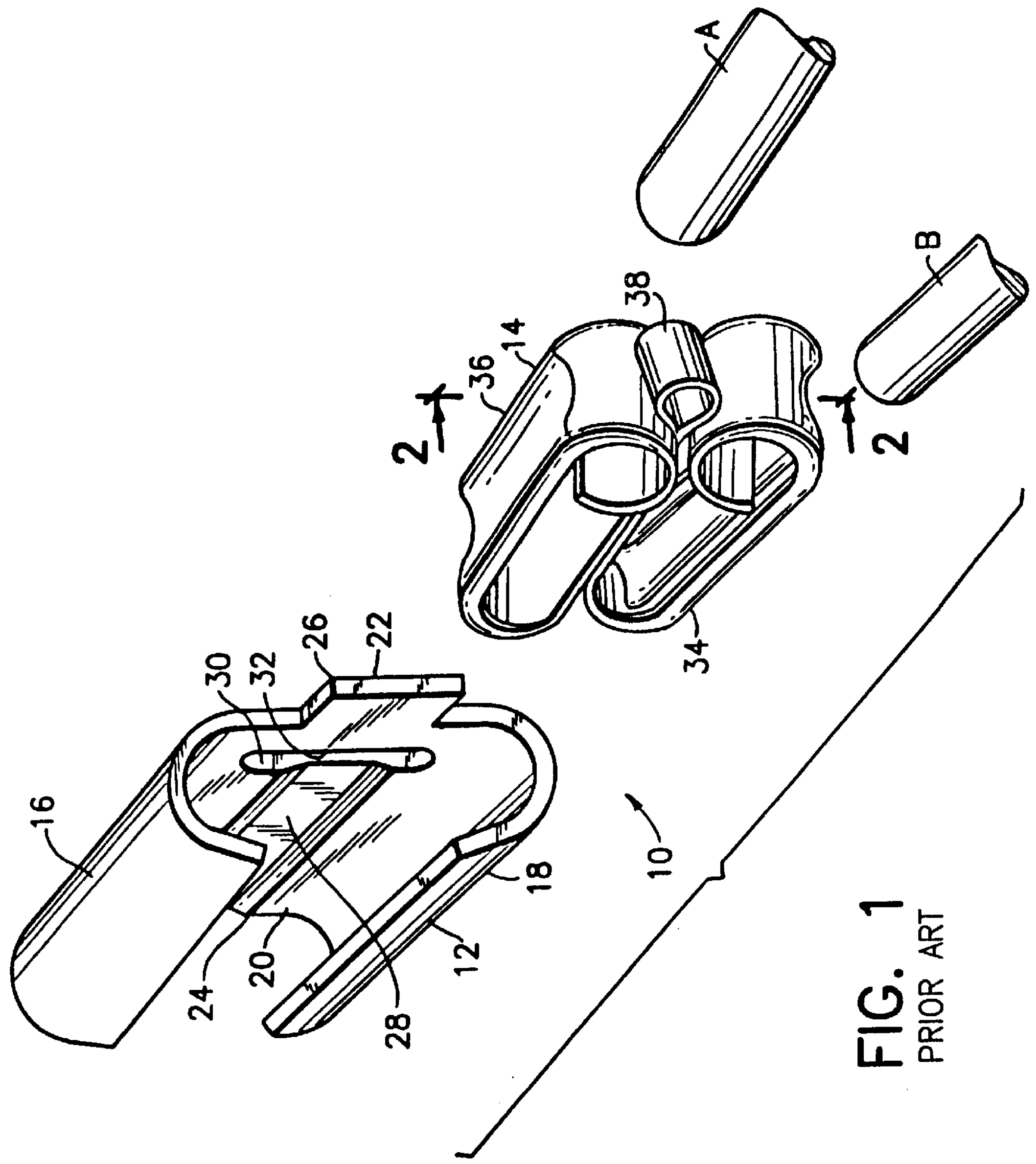
FIG. 1 PRIOR ART
FIG. 1 is an exploded perspective view of a known and typical electrical wedge connector on which the removal tool of the present invention is intended to be used.
Figure 5:
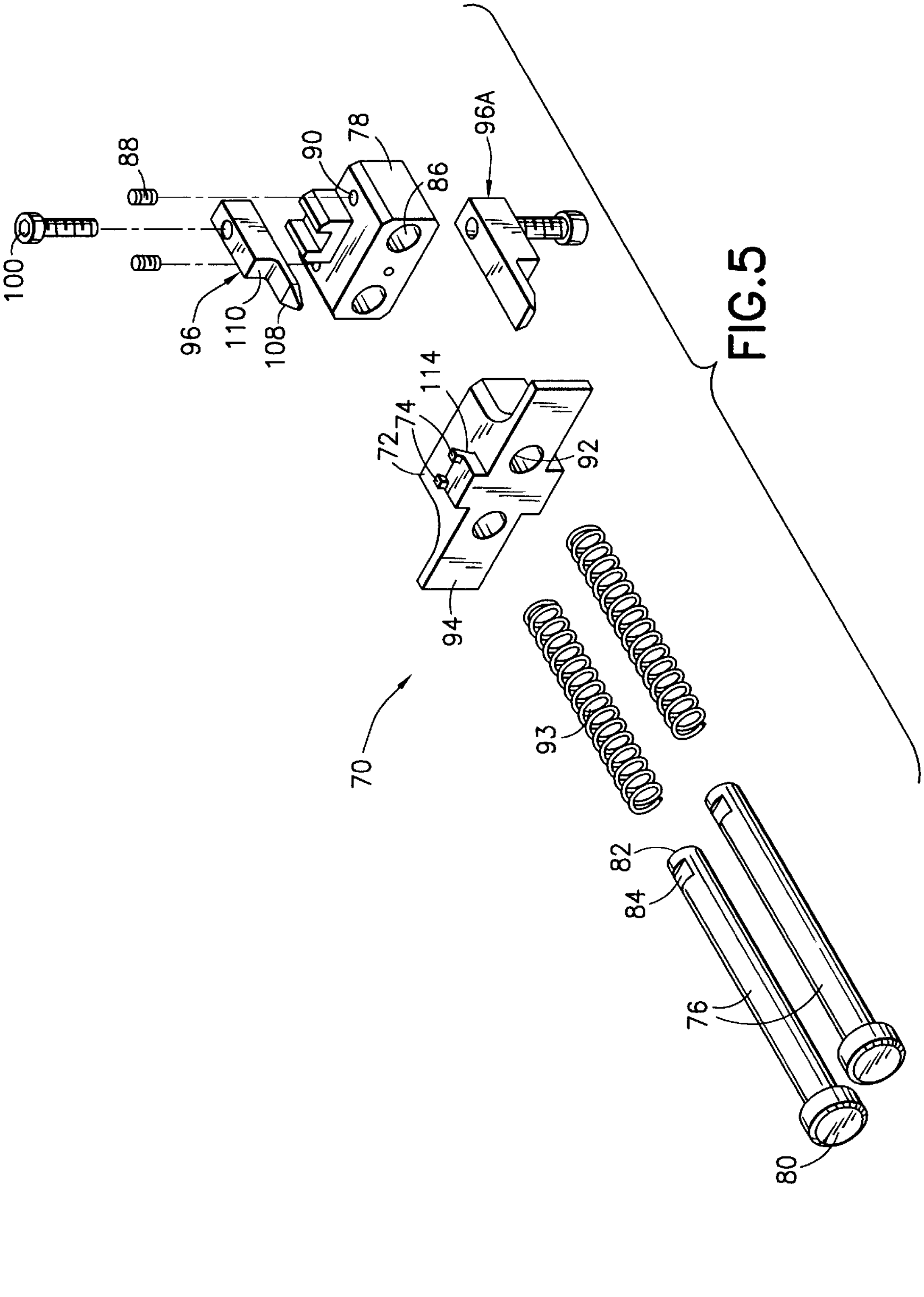
FIG. 5 is an exploded perspective view of a removal tool embodying the invention for separating the components of an assembled electrical wedge connector of the type illustrated in FIGS. 1–4.
Figure 6:
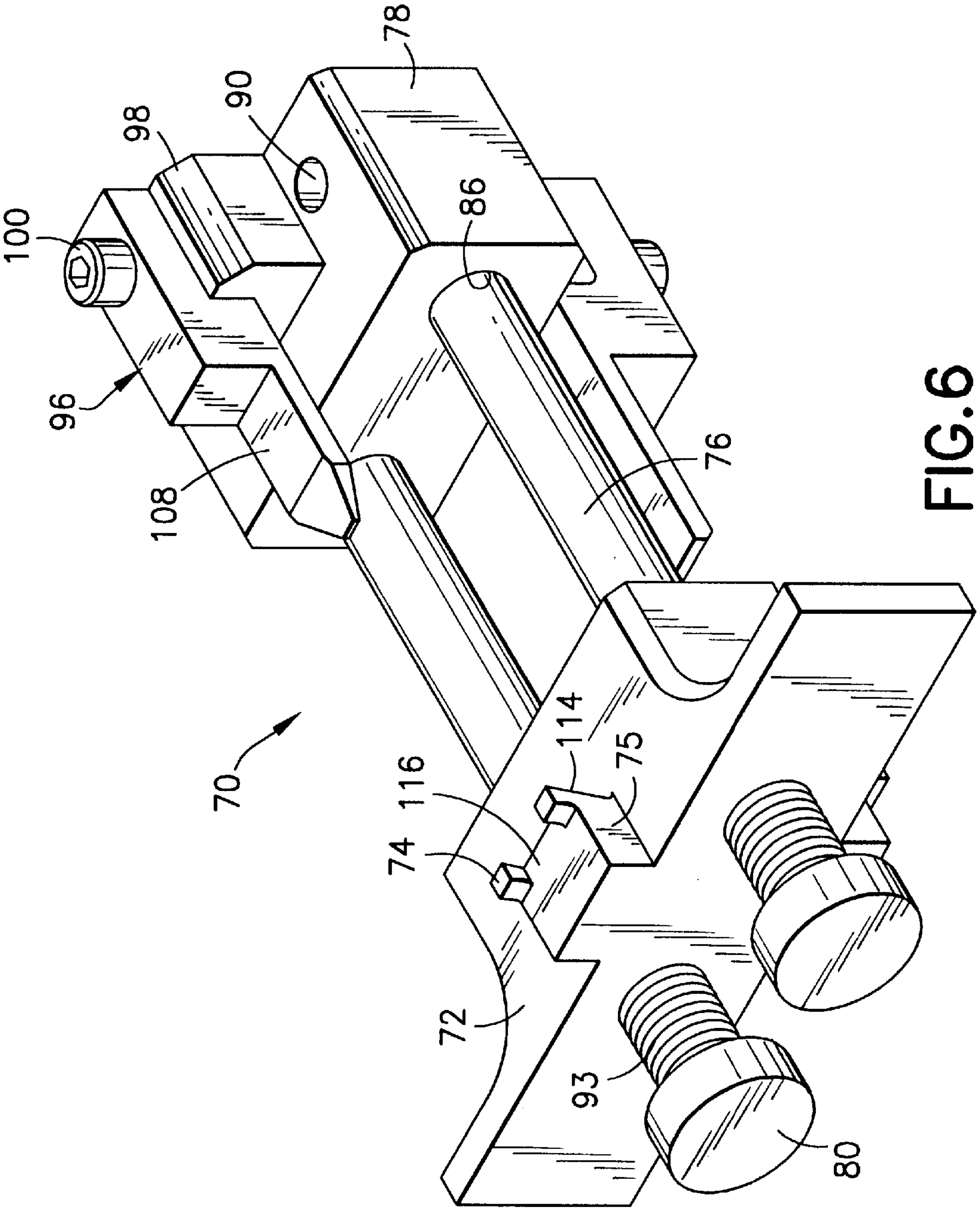
FIG. 6 is a perspective view of one side of the assembled removal tool illustrated in FIG. 5, capable of operating on one range of sizes of an electrical wedge connector.
Figure 7:
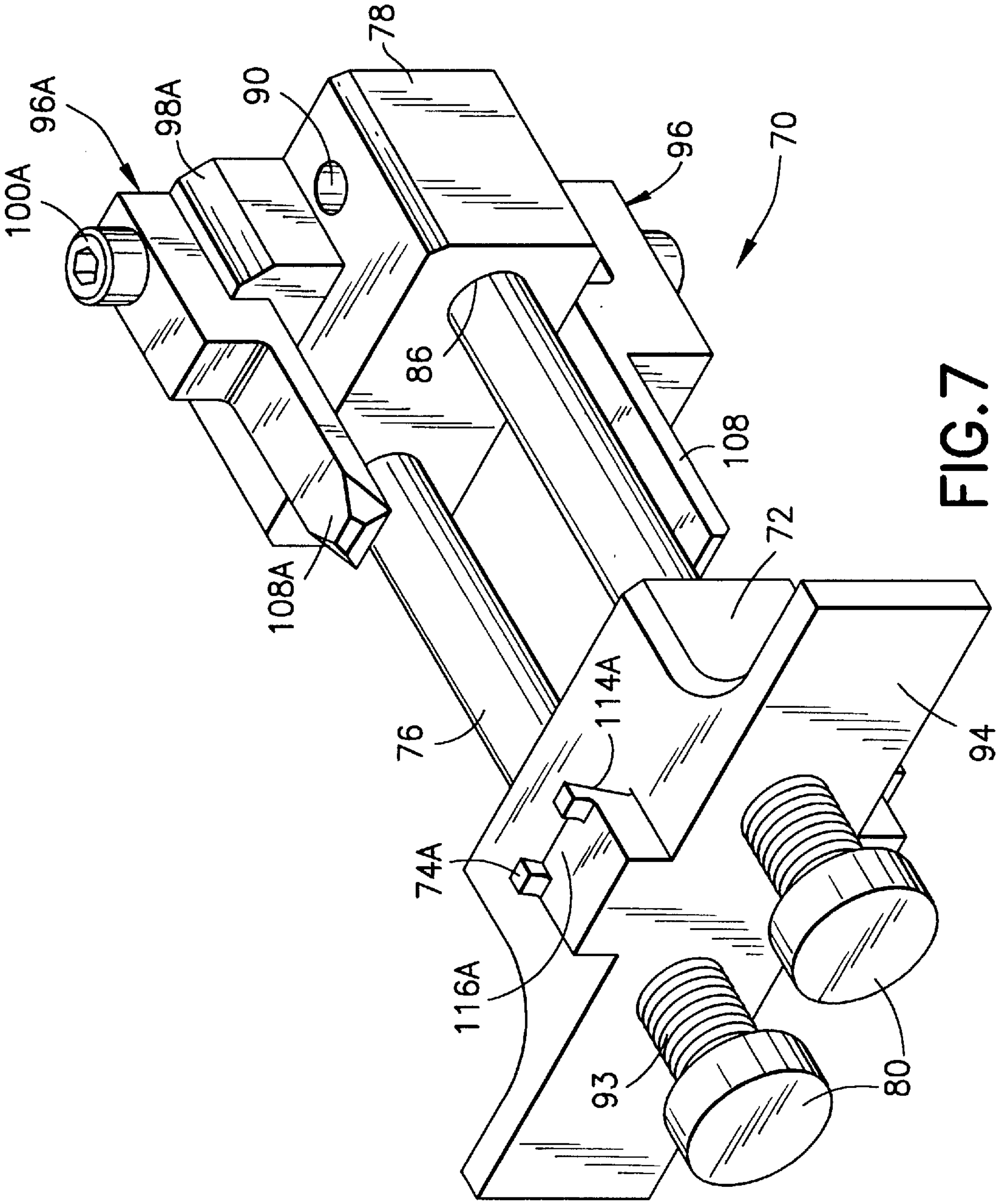
FIG. 7 is a perspective view, similar to FIG. 6, of another side of the assembled removal tool illustrated in FIG. 5, capable of operating on another range of sizes of an electrical wedge connector.
Figure 8:
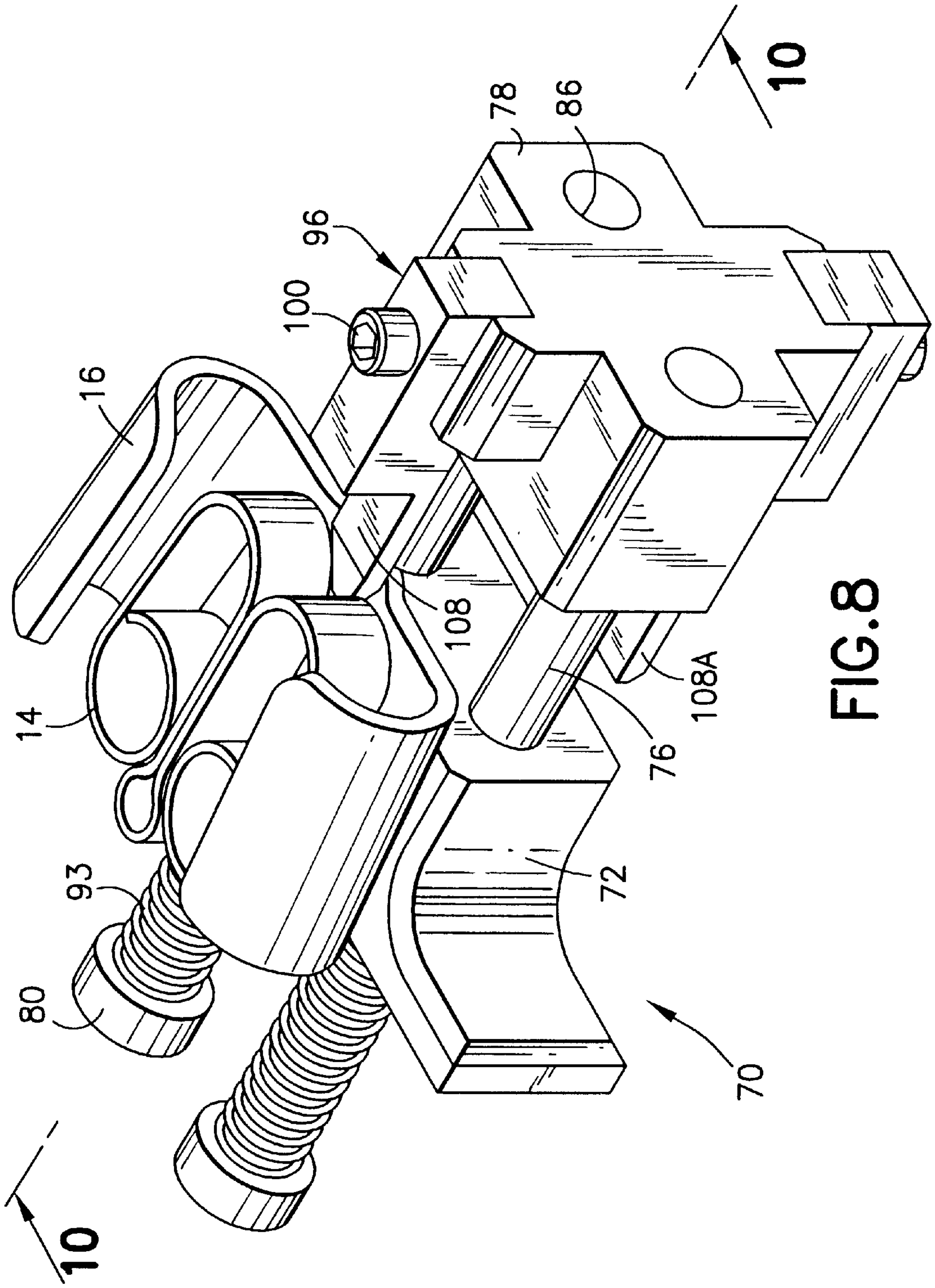
FIG. 8 is a perspective view of the removal tool of the invention with an electrical wedge connector (less conductors) positioned on the removal tool and awaiting an operation for separating its components.
Figure 9:
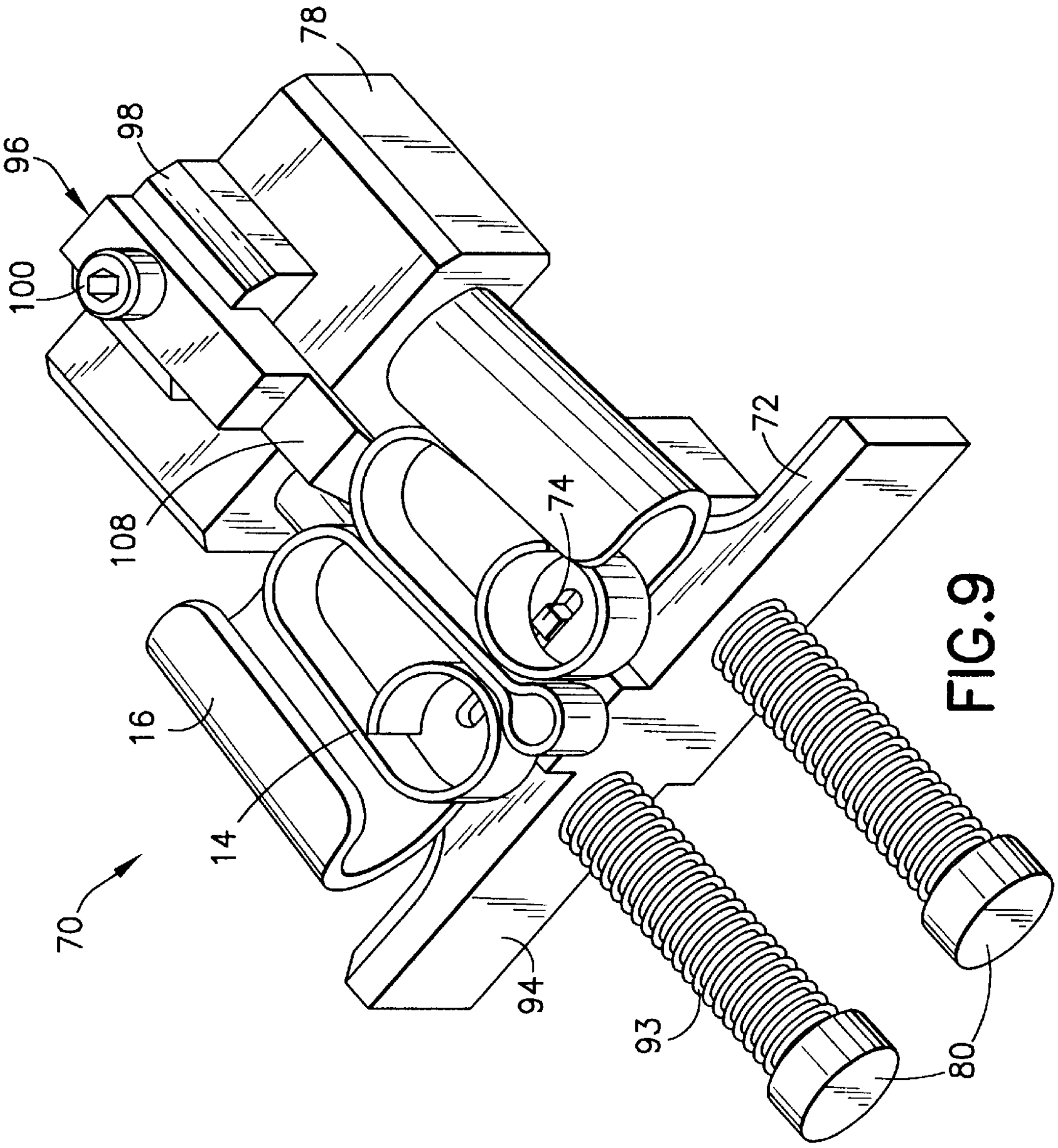
FIG. 9 is another perspective view, similar to FIG. 8, but taken from another direction.
Figure 10:
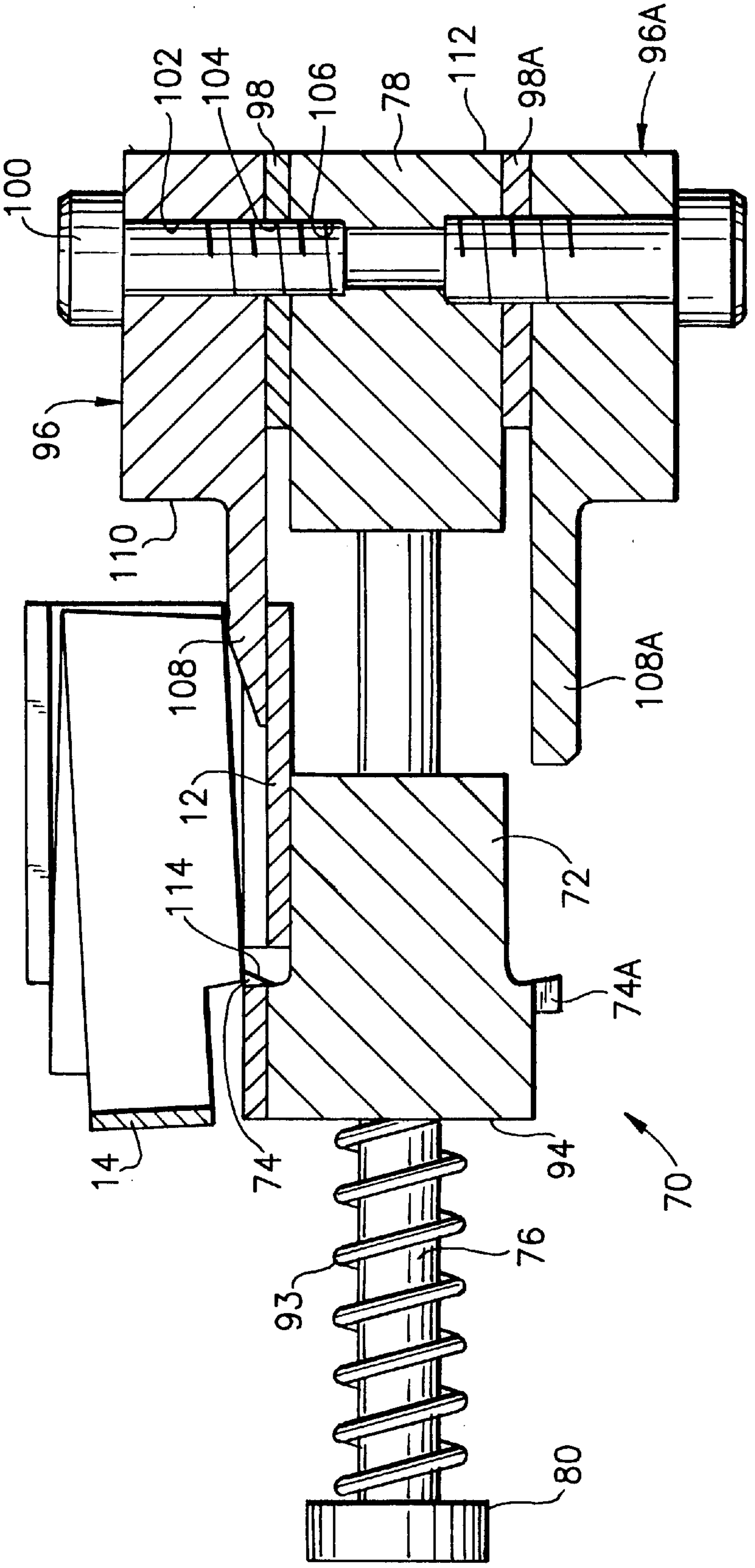
FIG. 10 is a cross section view taken generally along line 10—10 in FIG. 8.

Referring to FIG. 1, there is shown an exploded perspective view of a known and typical wedge connector 10 for connecting two electrical conductors A, B together.

The connector 10 generally comprises a connector sleeve or shell 12 and a spring wedge 14. The sleeve 12 is preferably made of sheet metal, but it could also be a cast, drawn, or extruded member. The sleeve 12 has two opposing channel sections 16, 18 interconnected by a middle section 20 to form a general "C" shape. Referring also to FIG. 4, the "C" shape tapers from the rear end 22 to the front end 24. The middle section 20 includes a rear end tab 26, a groove or depression 28, and a slot 30. The slot 30 is located proximate the rear end of the sleeve and forms a stop ledge 32. The slot 30 extends entirely through the middle section 20 from the interior surface to the exterior surface. In an alternate embodiment that slot 30 might not extend entirely through the middle section 20. The depression 28 extends from the slot 30 to the front end 24 of the sleeve. In another alternate embodiment, the depression 28 might not extend to the front end 24, but the slot 30 would be located at the rear end of the depression 28.

The wedge 14 is comprised of a single elongate sheet metal member that has been deformed into the shape shown. Referring also to FIGS. 2 and 3, the sheet metal member has been folded over itself in a lengthwise direction several times along its length to form the wedge 14. In alternate embodiments, more or less folds could be provided. The wedge 14 has two adjacent main loop sections 34, 36 interconnected by a third loop section 38. The two longitudinal ends 40, 42 of the sheet metal member are located in the two main loops 34, 36, respectively. The third loop 38, in addition to interconnecting the first and second main loops 34, 36 also functions as a back support or containment support for the main loops 34, 36 at areas 44, 46. Because of the curved nature of areas 44, 46 and the third loop 38, when the wedge is compressed as indicated by arrows C in FIG. 3, the ends 40, 42 can be rotated as indicated by arrows D towards the inside surfaces of the main loops 34, 36. If the compressive force C is sufficient enough, the ends 40, 42 can contact the inside surfaces of the main loops 34, 36 to add rigidity to the main loops. The backsides 48, 50 of the main loops 34, 36 are located adjacent each other. The exterior sides 52, 54 of the main loops 34, 36 have grooves 56, 58 for locating the conductors A, B in. In the embodiment shown, the depth of the groove 56 in the first main loop 34 is greater than the depth of the groove 58 in the second main loop 36 for accommodating a larger conductor. However, any type of suitable shapes could be provided on the exterior sides 52, 54.

Referring particularly to FIG. 3, one of the lateral sides of the wedge 14 has a latching ledge 60. More specifically, the lateral side 62 of the backsides 4S, 50 progressively extend in a lateral direction from the front to the rear which then form the ledge 60 just before the third loop 38. The side 62, thus, forms a ramp in front of the latching ledge 60. The latching ledge 60 is adapted to be located in the slot 30 of the connector sleeve 12 to prevent the wedge 14 from being inadvertently disengaged from the sleeve 12. The ramp formed by the lateral side 62 of the backsides 48, 50 is provided to ease insertion of the wedge 14 into the sleeve 12 over the section of the sleeve rear of the stop ledge 32. The interior depression longitudinal 28 on the middle section 20 of the sleeve 12 is provided in front of slot 30 to accommodate the lateral side ramp of the wedge 14. As seen in FIG. 4, when the connector 10 connects the two conductors A, B, the latching ledge 60 is located in the slot 30 such that the stop ledge 32 can engage the latching ledge 60 to prevent unintentional removal of the wedge 14 from inside the sleeve 12. However, the slot 30 nonetheless allows a user access to the side 62 if it is desired to intentionally remove the wedge 14 from the sleeve 12 as in the instance of the present invention.

Turn now to FIGS. 5–10 for a detailed description of a removal tool 70 for separating the components of the assembled electrical connector 10, specifically, shell 12 and wedge 14. A first block member 72 includes outwardly projecting ears 74 on a raised platform 75 integral with the block member 72 for selective insertion into the slot 30 of the connector sleeve 12 for engagement with the stop ledge 32.

A pair of elongated slide pins 76 are integral with a second block member 78 and each slide pin projects away from the second block member to terminate at a boss 80. As illustrated, close to an end 82 of each of the slide pins 76 and distant from the boss 80 is an undercut 84. Each end 82 is slidably received in a bore 86 of the second block member 78 but then integrated with the block member. More specifically, with the end 82 fully received in the bore 86, a set screw 88 (FIG. 5) threadedly engaged with a tapped bore 90 is aligned with the undercut 84 and, when the set screw is fully tightened, engages the undercut and thereby prevents removal of the slide pin from the block member 78.

The block member 72 is formed with a pair of parallel spaced apart clearance bores 92 which are slidably received on the slide pins for movement toward and away from the block member 78. Helical springs 93 are desirably coaxially received on the slide pins so as to extend between the bosses 80 and a face 94 of the block member 72 so as to bias that block member toward the block member 78.

A removal blade fixture 96 is mounted on a slotted platform 98 which, in turn, is mounted on the block member 78, and both components are attached to the block member by means of a suitable bolt 100 extending through respective clearance bores 102, 104 (see especially FIG. 10) into a tapped bore 106. The removal blade fixture 96 has a tapered nose member 108 projecting toward the block member 72 and an integral shoulder 110 which faces the block member 72 and is spaced from the nose member in a direction away from the block member 72.

With this construction, the assembled electrical wedge connector 10 is positioned on the removal tool 70 (see FIGS. 8–10) with the ears 74 projecting into the slot 30 of the connector sleeve 12 and the narrowed (front) end 24 of the connector sleeve facing the block member 78. The tapered nose member 108 is inserted between the wedge 14 and the connector sleeve 12. Viewing especially FIG. 10, movement of the block member 72 toward the block member 78 (toward the left) causes the latching ledge 60 of the wedge to disengage from the stop ledge 32. With continued movement of the block member 72 toward the block member 78, the shoulder 110 engages the wedge 14 and forces removal of the wedge from the connector sleeve. While the springs 93 serve initially to hold the tapered nose member 108 firmly into engagement with the wedge 14, continued operation is desirably performed by means of adjustable pliers (not shown) for continuing to apply the force, respectively, on the face 94 of the block member 92 and on a face 112 of the block member 78 to thereby remove the wedge from the connector sleeve.

The raised platform 75 includes a stop ledge engagement surface 114 which lies in a laterally extending plane slanted with respect to the direction movement of the block member 72 for more fully engaging the stop ledge 32 of the connector sleeve 12. Additionally, it will be appreciated that the projecting ears are upstanding and spaced apart so as to define between them a slide channel 116 for the slidable reception of the nose member 108 as the block member 72 advances toward the block member 78. They also provide for visual indication for centering the removal tool about the nose member 108.

Furthermore, it will be appreciated that the removal tool 70 desirably comprises more than one set of the removal blade fixture 96 and associated raised platform 75 and accompanying ears 74. More specifically, the construction illustrated in FIG. 6 incorporates the nose member 108 sized and shaped to readily separate the components, for example, of ANSI size 3, 4, and 5 wedge connectors. In contrast, the construction illustrated in FIG. 7 incorporates a modified nose member 108A (on modified removal blade wedge 96A) sized and shaped to readily separate the components, for example, of ANSI size 1, 2, 6, and 7 wedge connectors. In all other respects, however, the opposing sides of the removal tool 70 are the same. With this construction, an operator of the removal tool can readily switch from separating the components of one series of sizes of an assembled electrical connector to separating the components of another series of sizes of the same type of assembled electrical connector.

While preferred embodiments of the invention have been disclosed in detail, it should be understood by those skilled in the art that various other modifications may be made to the illustrated embodiments without departing from the scope of the invention as described in the specification and defined in the appended claims.

What is claimed is:

1. A removal tool for separating components of an assembled electrical connector used for connecting electrical conductors together, the electrical connector including a connector sleeve having a general "C" cross section with a slot defining a stop ledge, the connector sleeve extending between a narrowed end and a broadened end, and a wedge adapted to be inserted into the connector sleeve and having a latching ledge on a lateral side for reception into the slot and terminating at a lateral side for engaging the stop ledge to prevent removal of the wedge from the connector sleeve, the removal tool comprising:

a first block member including outwardly projecting laterally spaced ear means defining a slide channel therebetween for selective insertion into the slot of the connector sleeve for engagement with the stop ledge;

a second block member;

elongated slide pin means having a longitudinal axis integral with the second block member and projecting away therefrom, the ear means of the first block member projecting in a direction transverse of the longitudinal axis of the slide pin means;

the first block member being slidably received on the slide pin means for movement toward and away from the second block member;

a removal blade fixture on the second block member having a tapered nose member projecting toward the first block member and an integral shoulder facing the first block member and spaced from the tapered nose member in a direction away from the first block member, the nose member being coplanar with the ear means;

such that when the assembled electrical connector is positioned on the removal tool with the ear means projecting into the slot of the connector sleeve and the narrowed end of the connector sleeve facing the second block member and the tapered nose member is inserted between the wedge and the connector sleeve movement of the first block member toward the second block member causes the nose member to advance through the slide channel between the ear means and causes the latching ledge of the wedge to disengage from the stop ledge, and such that with continued movement of the first block member toward the second block member the shoulder engages the wedge and forces removal of the wedge from the connector sleeve.

2. A removal tool as set forth in claim 1 including:

resilient means biasing the first block member toward the second block member.

3. A removal tool as set forth in claim 1 including:

a boss at one end of the slide pin means; and resilient means on the slide pin means oppositely engaged with the boss and with the first block member biasing the first block member toward the second block member.

4. A removal tool as set forth in claim 1 wherein the slide pin means includes:

a pair of longitudinally extending laterally spaced slide pins, each integral with the second block member and projecting away therefrom, the first block member being slidably received on both of the slide pins;

a boss at a terminal end of each of the slide pins; and resilient means on each of the slide pins oppositely engaged with the boss and with the first block member biasing the first block member toward the second block member.

5. A removal tool as set forth in claim 4 wherein the resilient means is a helical spring coaxially received on each of the slide pins.

6. A removal tool as set forth in claim 1 wherein the projecting ear means includes a stop ledge engagement surface which lies in a laterally extending plane slanted with respect to the movement of the first block direction for more fully engaging the stop ledge of the connection sleeve.

7. A removal tool as set forth in claim 1 wherein the projecting ear means includes a pair of spaced apart upstanding ears which define between them a slide channel for slidable reception of the removal blade as the first block member advances toward the second block member and also to provide for visual indication for centering said removal tool about the tapered nose member.

8. A removal tool as set forth in claim 1 characterized in that it comprises a first set of the removal blade, shoulder and ears located on one side of the block members and a second set of the removal blade, shoulder and ears located on an opposite set of the block members.

* * * * *